May 25, 1926.
J. G. KERST
1,586,042
TRACTOR CULTIVATOR
Filed Jan. 5, 1923   3 Sheets-Sheet 1
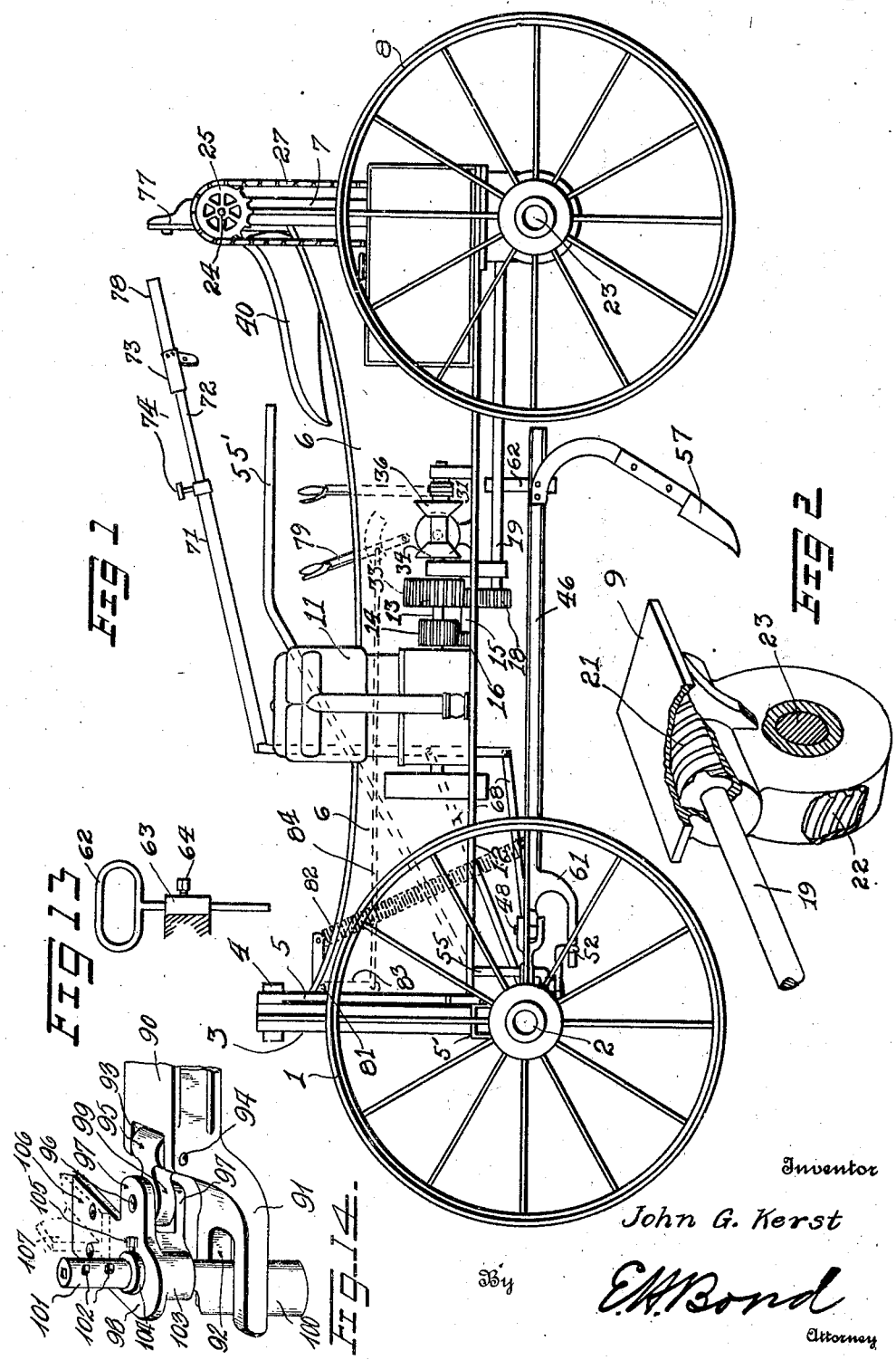
Inventor
John G. Kerst
By
E. W. Bond
Attorney May 25, 1926.
J. G. KERST
1,586,042
TRACTOR CULTIVATOR
Filed Jan. 5, 1923
3 Sheets-Sheet 2
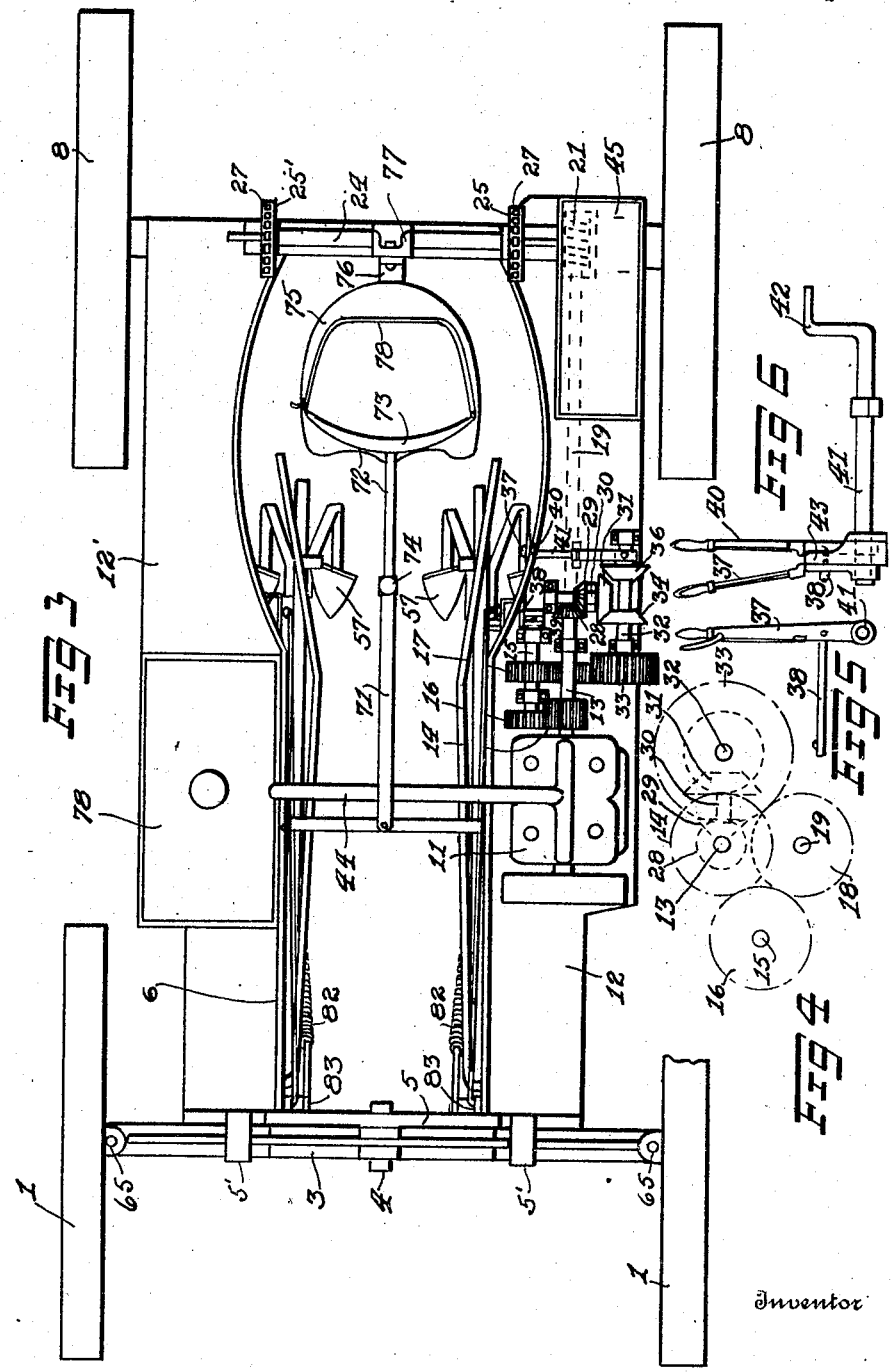
Inventor
John G. Kerst
E. H. Bond
Attorney
By

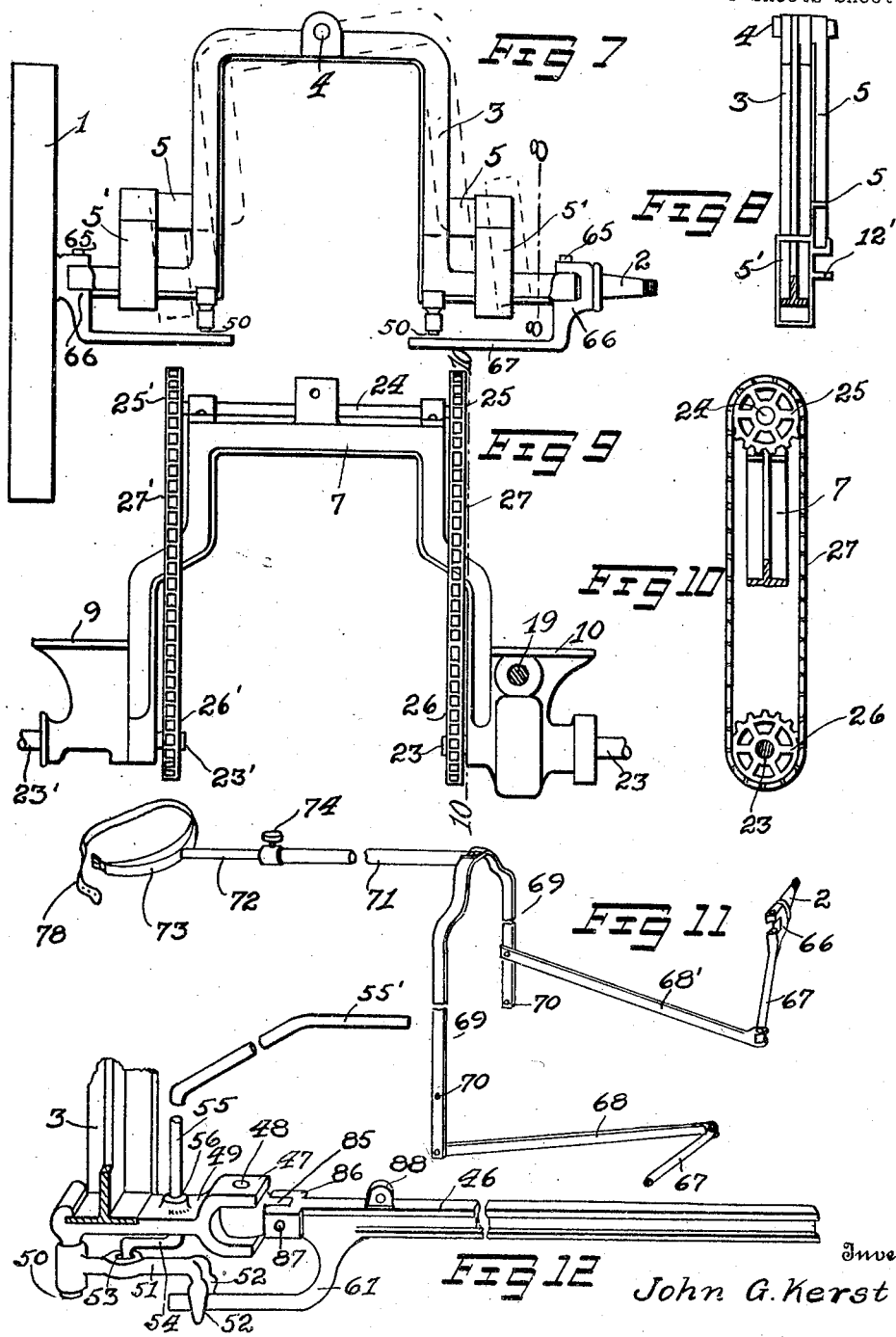

Patented May 25, 1926.

1,586,042

UNITED STATES PATENT OFFICE.

JOHN G. KERST, OF SPRINGFIELD, ILLINOIS.

TRACTOR CULTIVATOR.

Application filed January 5, 1923. Serial No. 610,794.

This invention relates to improvements in agricultural machinery, of that general class known as tractor machines, and the present invention pertains more especially to a motor-driven agricultural implement of the cultivator type particularly adapted for the cultivation of corn and similar products.

The present invention has for its objects among others to provide an implement of this general character which will be simple in construction, inexpensive of manufacture, efficient and reliable in its action and which will most effectually perform the services for which it is designed, more particularly the cultivation of corn and the like of different heights.

The invention has for a further object to provide simple and efficient means for guiding and controlling the plows or other earth implements of the device and also for steering and operating the device in a suitable and convenient manner.

It has for a further object to provide means whereby the operator may use his foot for forcing the plows or other earth implements into the ground or raise the same when desired, thus leaving his hands free for the manipulation of the steering and operating mechanism.

Other objects and advantages of the invention will hereinafter appear, and the novel features thereof will be specifically defined by the appended claims.

The invention is capable of embodiment in a variety of forms and subject to variations in proportions and arrangements of parts, etc., without departing from the spirit of the invention or sacrificing any of its advantages.

The invention, in its preferred form, is clearly illustrated in the accompanying drawings, which, with the numerals of reference marked thereon, form a part of this specification, and in which Figure 1 is a side elevation of a cultivator embodying the improvements of my invention.

Figure 2 is a fragmentary perspective view of the drive shaft and means for rotating the rear axles.

Figure 3 is a top plan view of my assembled cultivator.

Figure 4 is a diagram of the transmission gear.

Figure 5 is a detail side elevation of the gear shifting lever.

Figure 6 is a rear elevation of the shaft for shifting the friction gears together with the quadrant and lever for operating the shaft, the gear-shifting lever being shown therewith in its operating position.

Figure 7 is a front elevation of the pivoted yokes upon which the foward wheels and body of my cultivator are mounted.

Figure 8 is a sectional view through the pivoted yoke taken on line 8—8 of Figure 7, a portion of the yoke being shown in side elevation.

Figure 9 is a front elevation of the yoke upon which the rear wheels are mounted.

Figure 10 is a sectional view of the rear yoke taken on line 10—10 of Figure 9.

Figure 11 is a perspective view of the device for steering the forward wheels of my cultivator.

Figure 12 is a perspective view of the cultivator beam and mounting means therefor.

Figure 13 is a detail front elevation of the stirrup for raising and lowering the cultivator shovels.

Figure 14 is a detailed perspective view of a modified form of the cultivator beam mounting.

Like numerals of reference indicate like parts throughout the several views.

Referring now to the drawings:

1 designates the forward wheels of my cultivator, which are mounted to stub axles 2 carried by an inverted U-shaped yoke 3. The yoke 3 is pivoted through bearing 4 to an inverted U-shaped body yoke 5 provided on the forward end of the body 6. Each side of yoke 5 is provided with a forwardly projecting box 5' attached thereto, said box having a horizontal opening therethrough adapted to surround the axle-bearing projections on the lower end of the yoke 3, thus to insure face to face engagement between the two yokes and to allow for lateral swinging of the yoke 3 about the pivoting point 4. The rear end of the body 6 is supported by an inverted yoke 7, which is, in turn, supported by the rear drive wheels 8, the rear end of the body being supported on brackets 9 and 10 carried by the yoke 7.

I provide novel means for driving my device, an engine 11 being provided on a running board 12, supported on the forward end by bracket 12', on the yoke 5 and on the rear end by the bracket 9 of the yoke 7. Rearwardly extending crank shaft 13 of the engine is provided with a drive gear 14, which is in continuous rotation. Parallel to and slightly lower than drive shaft 13 is a longitudinally slidable shaft 15, having a gear 16 mounted on its forard end, and the gear 17, also mounted on the shaft 15, is spaced rearwardly from the gear 16. The gear 17 is positioned to be brought into mesh with the drive gear 18 carried on the drive shaft 19 directly below and parallel to the engine shaft 13. I provide the continuously rotating gear 14 on the crank shaft 13 of sufficient width so that the longitudinally shiftable shaft 15 may be moved to throw the gear 17 out of mesh with the gear 18 without the gear 16 being shifted out of mesh with the gear 14. It will thus be seen that the shaft 15 will be continuously rotated by gear 14, but that that rotation will not be transmitted to the gear 18 and the shaft 19 unless the gear 17 is shifted to its meshed position with gear 18. It will also be seen that when the gears 17 and 18 are in mesh, the drive shaft 19 will be rotated to drive the cultivator forward, the rear end of the shaft 19 being provided with a worm 21 on its rear end, which worm is in mesh with a worm gear 22 mounted on the rear axle 23.

It will be seen that the means for driving the rear wheels comprises two axles 23 and 23', one mounted on each side of the yoke 7. In order to transmit the drive across the yoke, I provide a line shaft 24 mounted on the upper edge of the yoke 7 parallel to the axles 23 and 23'. On each end of the shaft 24 I provide sprockets 26 and 26'. Sprocket chains 27 and 27' are trained respectively over sprockets 25 and 26 and sprockets 25' and 26'. It will thus be seen that the transmission of the drive from one side of the yoke to the other is effected.

In order to reverse the drive from the crank shaft 13, I provide a bevel gear 28 on the rear end of the shaft 13, and a second bevel gear 29 is carried at right angles to the gear 28 and in mesh therewith, a gear 29 being mounted on the shaft 30. On the outer end of the shaft 30 I provide a friction disc 31. Mounted on a longitudinally shiftable shaft 32 which is parallel to the crank shaft 13, I mount a gear 33 which is in mesh with the gear 18 of the drive shaft 19. Adjacent the rear end of the shaft 32 I provide a friction disc 36 adapted to engage the disc 31. The disc 36 is slidably mounted to move longitudinally on the shaft 32, means being provided for throwing the disc 36 in and out of engagement with the disc 30. It will be seen that the bevel gear 28 will rotate the shaft 30 and the friction disc 31 through the medium of the bevel gear 29. Likewise, it will be seen that the friction disc 31 will rotate the shaft 32 in a reverse direction, which rotation will be transmitted to the drive shaft 19 through the medium of the gears 33 and 18.

I prefer to mount the shaft 32 to slide longitudinally, and on this shaft, and spaced forward from the disc 36, I provide a disc 34. It will be seen that by sliding the shaft 32, either disc 34 or 36 may be thrown into engagement with the drive disc 31. This provides for either a forward or reverse friction drive, the forward drive being found effective when starting the device, the positive drive being later thrown into operation in order to save the friction discs from wear.

I provide levers for operating the transmission, the same being shown in Figures 5 and 6. Numeral 37 indicates an upstanding lever at any convenient point on the body, and comprising a reach rod 38 pivoted to a collar 39 carried on the rear end of the shaft 15. It will be seen that the lever 37 provides means for shifting the shaft 15 longitudinally, whereby the gears 17 may be thrown into and out of mesh with the gear 18. I likewise provide an upstanding lever 40 mounted to rotate the shaft 41, on the outer end of which shaft is a crank 42 engaged to a collar carried by the shaft 32 on which friction discs 34 and 36 are mounted. It will be seen that upon the rotation of the shaft 31, the crank 42 will readily shift the shaft 32, thus throwing the discs 34 and 36 selectively into and out of engagement with the disc 31. A quadrant such as 43 has been provided to lock levers 37 and 40 in their different limits of travel.

The body of my cultivator is preferably provided with two running boards 12 and 12' carried at right angles to vertical spaced apart side boards comprising the body 6, the central portions between the side boards being open as is shown clearly in Figure 3. A seat 75 is supported in a central opening adjacent the rear yoke 7. An angular bracket 76 is attached to the center boss 77 on the upper face of the yoke. A series of holes in the upright neck of the bracket 76 are preferably provided for the purpose of providing adjustment for height of the seat, especially desirable to accommodate different heights of corn. On running board 12' I provide a water tank 78, a pipe connection 44 being extended across the body 6 to provide cooling means for the engine 11. Adjacent the rear end of the running board 12 I provide a gasoline tank 45, the usual piping means being provided to supply fuel to the engine.

My cultivator plows are mounted to the forward yoke 3 in the novel manner shown in Figures 7 and 12. I provide a pair of spaced-apart cultivator beams 46, which are attached one on each side of the yoke 3, and are adapted to extend rearwardly beneath the body 6. Each of the beams 46 are pivoted to a knuckle 85 by a horizontal pivoting pin 87. The knuckle 85 is, in turn, pivoted to a yoke 47 by a vertical pivoting pin 48. The yoke 47 is supported by the bracket 49 attached to the yoke 3. On the under side of the bracket 49 is a downward projecting pivoting pin 50 upon which is mounted a lever 51 adapted to rotate about the pin 50. The lever 51 extends rearwardly, and is provided on its rear end with a pair of downwardly extending fingers 52. A crank 61 is provided on the under edge of the beam 46, which crank extends forward between the fingers 52, which fingers engage the crank one on each side. Adjacent the center of the length of the lever 51 is a vertical perforation 53 and a crank 54 passes through said perforation. The crank 54 is provided with a vertical shaft 55 which extends upward through a vertical perforation 56 provided in the bracket 49, the shaft 55 being bent rearwardly to form a handle 55' within easy reach of the operator on the seat 75.

It will be readily seen that the cultivator plows 57 carried on the rear end of the cultivator beams 46 may be laterally shifted by means of the shaft 55. By swinging the rear end of the handle 55' laterally, the lower end of the crank 54 may be swung around in the bracket 49, thus rotating the lever 51 about the pivoting pin 50 through the medium of the engagement of the crank 54 in the perforation 53. The fingers 52 on the lever 51 will engage the crank 61 of the cultivator beams, thus swinging the rear end of the cultivator beam around the pivoting pin 48.

In lieu of the foregoing mounting for the end of the cultivator beam, I may sometimes employ the construction shown in Figure 14, to which attention is now directed.

In this figure, 90 is the cultivator beam provided with a crank 91, the forward end of which is bifurcated, as seen at 92, while at the upper rear end of the portion 91 is a bifurcation 93 in which is pivotally mounted on a cross pin 94 a yoke 95 in which is mounted the vertical pin 96 which passes through the ears 97 of the member 98 and through the ear 99, as clearly shown in Figure 14.

100 is a vertically disposed eccentric having a round shank 101 having openings 102. This shank is passed upward through the collar 103 of the member 98, as shown, and 104 is a washer around this shank 101 and held thereon by a set screw or the like 105. The member 98 has the lateral extension 106 which is screwed or otherwise secured to the cross member 107 of the tractor, the last-named member being indicated by dotted lines in Figure 14.

The operation of this form of connection is substantially the same as that shown in Figure 12, but the construction may be found much simpler, the number of parts being materially reduced.

I prefer to provide the rear end of my cultivator beam 46 with stirrups 62, provided with an eye through which the foot of the operator may be inserted to force the shovels into the ground or to raise the same when it is so desired. The stirrup 62 is provided with a downward extending strap inserted through a vertical perforation in a block 63 attached on the inner side of the beam 46. A set screw 64 is provided in the block 63 whereby the downward extending strap of the stirrup may be engaged adjustably to provide for different lengths of foot reach. In order to hold the cultivator beams in a fixed position, when the shovels are raised out of the ground, and also to assist in the operation of raising them, I provide a coil spring 82 for each cultivator beam, the spring being engaged thereto by means of an eye 88 carried by the beam. The other end of the spring 82 is engaged to the rear end of the horizontal leg of a bell-crank 83 horizontally pivoted at point 81 to the forward body yoke 5. The lower end of the vertical leg of the bell-crank 83 is pivoted to a reach rod 84, the opposite end of which reach-rod is pivotally engaged to a hand lever 79, preferably above the fulcrum point thereof on the body. It will be understood that one complete device for raising the beams is provided on each side of the body opening, by which each cultivator beam may be actuated and locked in position independently of the other.

I provide a novel means for steering the forward wheels of my cultivator, the same being shown in Figure 11. The stub axles 2 are vertically pivoted to the yoke 3 by means of the pivoting pins 65, a yoke 66 being formed on the inner end of the axles 2 adapted to receive the yoke 3. The crank 67 is provided on the under side of the yoke 66, the crank extending inward. A reach rod 68 is pivoted to the inner end of the crank 67, the reach rod extending rearwardly, making pivotal engagement with a vertical arched lever 69. It will be understood that each of the stub axles 2 is thus provided with cranks 67 and reach rods 68, and that the vertical lever 69 comprises two parallel members, one on each side of the central opening in the body 6. On one side of the body the vertical arch 69 is provided with its fulcrum point 70 adjacent its lower end, the reach rod 68' being pivoted above the fulcrum point. On the opposite side the reach rod 68 is pivoted adjacent the lower end of the lever 69, the fulcrum point 70 being spaced above the pivoting point of the reach rod. Pivoted to the upper portion of the arch 69 is a rearwardly extending steering bar 71, preferably tubular, and provided with a telescoping extension 72, having a breast piece 73 thereon. A strap 78 is engaged to the breast piece 73, and is adapted to be strapped about the operator when sitting on the seat 75, the breast-piece 73 being slightly in front of the operator, the strap to be carried beneath the arms. A set screw 74 is carried by the tubular steering bar 71, by which the extension 72 may be adjusted to suit the operator. It will be seen that upon the rearward movement of the operator's body, the bar 71 will be thrown backward, the vertical arch 69 being then swung rearwardly about the respective pivoting points 70. One of the reach rods 68 will thus be thrust forward and the other rearward, thereby actuating the cranks 67 in opposite directions. The stub axles 2 will thus be actuated to swing the wheels, one forward and the other rearward of the central line of the axle. Likewise a forward movement of the yoke will operate the wheels in the opposite direction by the reverse of the movement just described.

In lieu of the engine shown, I may sometimes employ a motor of any suitable type, and the engine or motor, may be placed in any desired position, for instance, it may be supported on the housing casting of the worm and differential gear.

From the foregoing it will be seen that I have devised a tractor cultivator that is simple in its construction, inexpensive of manufacture and capable of performing the functions for which it is designed, and while the structural embodiment of the invention as herein disclosed is what I at the present time consider preferable, it is evident that the same is subject to changes, variations and modifications in the details of construction, arrangement of parts, proportions, etc., without departing from the spirit of the invention or sacrificing any of its advantages. I, therefore, do not wish to restrict myself to the particular construction and arrangement of parts shown, but reserve the right to make such changes, variations and modifications as come properly within the scope of the protection prayed.

What is claimed as new is:—

1. In an agricultural machine, a power-driven truck, an inverted substantially U-shaped yoke for the support of the forward wheels, and an inverted substantially U-shaped yoke for pivotal connection with the first-named yoke, horizontal means pivotally connecting said yokes at their centres, said yokes disposed to insure face to face engagement and to allow of lateral swing of the first-named yoke.

2. In an agricultural implement, a power-driven truck, an inverted substantially U-shaped yoke for the support of the forward wheels, a second substantially U-shaped yoke pivotally mounted on the first named yoke, said yokes disposed to insure face to face engagement and to allow of lateral swing of the first-named yoke being mounted on a common horizontal pivot, and drive axles one mounted on each side of the first-named yoke.

3. In an agricultural machine, a power-driven truck, an inverted substantially U-shaped yoke for the support of the forward wheels, an inverted substantially U-shaped yoke having central pivotal connection with the first-named yoke, drive axles one mounted on each side of the first-named yoke, and stub axles vertically pivoted to one of said yokes.

4. In an agricultural machine, a power-driven truck, an inverted substantially U-shaped yoke for the support of the forward wheels, a second substantially U-shaped yoke having central pivotal connection with the first-named yoke, stub axles vertically pivoted to one of said yokes, and means on the end of each stub axle to receive the last-named yoke.

5. In an agricultural machine, a power-driven truck, an inverted substantially U-shaped yoke for the support of the forward wheels, an inverted substantially U-shaped yoke having central pivotal connection with the first-named yoke, stub axles vertically pivotally mounted on one of said yokes, means on the end of each stub axle to receive the last-named yoke, and overhead means for transmitting power from one of the axles to the other.

6. In an agricultural implement, a power-driven truck, a body, rear and front wheels, an inverted yoke supporting the rear end of the body, a pair of substantially inverted U-shaped spaced-apart yokes at the forward end of the body, means for pivotally connecting the last named yokes at their top center, and means for insuring face to face engagement of the said last-named yokes and to allow lateral swinging of the one yoke with reference to the other and stub axles carried by said yokes.

7. In an agricultural implement, a power-driven truck embodying a body, spaced-apart yokes centrally suspended and mounted on a pivot common to both, stub axles carried by said yokes, and overhead power transmission means.

8. In an agricultural implement, a power-driven truck embodying a body, spaced-apart yokes one pivotally mounted on the other, and means operable by the movement of the body of the driver for steering the machine by control of the front wheels, said means being pivotally connected with the stub axles of the forward wheels.

9. In an agricultural implement, a power-driven truck embodying a body, spaced-apart yokes one pivotally mounted on the other, means operable by the movement of the body of the driver for steering the machine by control of the front wheels, said means being pivotally connected with the stub axles of the forward wheels, and a vertical arched lever having pivotal connection with the stub axles.

10. A forward yoke, a second yoke, means pivotally connecting said yokes at their centers, a housing casting, and a rear yoke secured to the housing casting and an axle bearing on each side of said housing casting and stub axles vertically pivoted to one of said yokes.

11. In a tractor having rear drive wheels, a rear yoke, a body-supporting housing bracket, a drive shaft and axle bearing bracket, said yoke being supported at its ends by the rear drive wheels and secured at one end to said housing bracket, and at the other end to the axle bearing bracket.

12. In a tractor cultivator having rear drive wheels, a rear yoke, a housing bracket, a drive shaft and axle bearing bracket, said yoke being supported by the rear drive wheels and secured at one end to the housing bracket and at the other end to the axle bearing bracket, side plates supported at one end on said brackets and extending forward so as to leave an open passageway between the sides of the yoke.

13. A forward yoke, a second yoke fulcrumed at the top of the first yoke, a rear yoke, side boards and running boards fastened to the second and rear yokes, there being an open space centrally the entire length of the tractor.

14. A forward yoke, a second yoke fulcrumed at the top of the first yoke, a rear yoke, side boards and running boards fastened to the second and rear yokes, there being an open space centrally the entire length of the tractor, and means for controlling the working implements.

15. A forward yoke, a second yoke, means pivotally connecting said yokes at their center, a housing casting, a rear yoke secured to said housing casting, worm and differential gears in said housing casting, an axle engaging said gears, a bull wheel on one end of said axle and a sprocket wheel on the other end for transmitting power from one side of the tractor to the other.

16. A forward yoke, a second yoke, means pivotally connecting said yokes at their center, a rear yoke, running and side boards securing the second yoke to the rear yoke, a shaft on top of the rear yoke, sprocket wheels on each end of said shaft, and sprocket chains engaging said sprocket wheels and coordinating with other sprocket wheels for the transmission of power from one side to the other.

17. In an agricultural implement, a power-driven truck, stub axles, an inverted U-shaped yoke carrying said stub axles, an inverted U-shaped yoke on the end of the body of the truck, said yokes being disposed in proximity to each other in parallel relation and the one pivotally mounted on the other, the stub axles being vertically pivoted to one of said yokes.

18. In an agricultural implement, a power-driven truck, stub axles, an inverted U-shaped yoke carrying said stub axles, an inverted U-shaped yoke on the end of the body of the truck, said yokes being disposed in proximity to each other in parallel relation and the one pivotally mounted on the other, the stub axles being vertically pivoted to one of said yokes, and a box on the inner end of each stub axle to receive the last-named yoke.

19. In an agricultural implement, a power-driven truck, stub axles, an inverted U-shaped yoke carrying said stub axles, an inverted U-shaped yoke on the end of the body of the truck, said yokes being disposed in proximity to each other in parallel relation and the one pivotally mounted on the other, the stub axles being vertically pivoted to one of said yokes, each side of the other yoke being provided with a forwardly-projecting box with opening to surround axle bearing projections on the lower end of the first-named yoke.

20. In a tractor cultivator, a rear axle in two sections, combined with a yoke and body-supporting brackets on said yoke, said sections being mounted one on each side of the said yoke, side boards supported at one end by brackets, and overhead means for the transmission of the drive, there being an open passageway between the said side boards extended substantially the entire length of the device.

21. In a tractor cultivator, a rear axle in two sections spaced apart, a U-shaped frame connecting the sections, a worm driven differential gear on one of said sections, and so arranged as to differentiate between the sections, and an overhead drive means extending from one section to the other.

22. In a tractor cultivator, separated stub axles, a bull wheel on one end only of each axle, a sprocket wheel on the other end of each of said axles, and means for transmitting motion from one of said axles to the other.

23. In a tractor cultivator, separated stub axles, a bull wheel on one end only of each axle, a sprocket wheel on the other end of each of said axles, and overhead means for transmitting motion from one of said axles to the other.

24. In a tractor cultivator, a yoke, rear divided and spaced stub axles, wheels thereon on the outer sides of said yoke only, running boards supported at one end only by the rear drive wheels an overhead shaft mounted above the yoke and parallel with said axles, and overhead means for transmitting power from one of said axles, through said shaft, to the other axle.

25. In a tractor cultivator, a yoke, a rear divided and spaced stub axles, wheels thereon on the outer sides of said yoke only, an overhead shaft mounted above the yoke and parallel with said axles, overhead means for transmitting power from one of said axles, through said shaft, to the other axle, a front axle, and running boards supported at one end by the rear drive wheels extending from the front to the rear axle and fixedly secured to form an open frame with the space extended the entire length of the tractor.

26. In a tractor, two spaced rear axle sections, a pivoted intermediate yoke, a rear yoke supported on the rear axle sections and forming a support for the rear end of the body, side plates supported by said yokes, brackets on said yokes, running boards supported on said brackets and extending longitudinally of the vehicle, said running boards serving as vehicle motor supports.

27. In a tractor, rear drive axle sections, a pivoted intermediate yoke, a rear yoke forming a support for the rear end of the body, brackets secured to the ends of said yokes, side plates secured to said yokes, running boards mounted on said brackets, said plates and running boards extending longitudinally of the vehicle and leaving a central open space throughout the length of the vehicle, one of said boards serving as the vehicle motor support.

In testimony whereof I affix my signature.

JOHN G. KERST.